(12) United States Patent
Lamon et al.

(10) Patent No.: US 10,725,471 B2
(45) Date of Patent: Jul. 28, 2020

(54) VIRTUAL LINE-FOLLOWING AND RETROFIT METHOD FOR AUTONOMOUS VEHICLES

(71) Applicant: BlueBotics SA, St-Sulpice/VD (CH)

(72) Inventors: Pierre Lamon, Epalinges (CH); Nicola Tomatis, Clarmont (CH); Grégoire Terrien, Saint-Sulpice (CH); Yannis Jeannotat, Mont-sur-Rolle (CH)

(73) Assignee: BLUEBOTICS SA, St-Sulpice/VD (CH)

( * ) Notice: Subject to any disclaimer, the term of this patent is extended or adjusted under 35 U.S.C. 154(b) by 144 days.

(21) Appl. No.: 15/761,480

(22) PCT Filed: Sep. 22, 2015

(86) PCT No.: PCT/EP2015/071799
§ 371 (c)(1),
(2) Date: Mar. 20, 2018

(87) PCT Pub. No.: WO2017/050357
PCT Pub. Date: Mar. 30, 2017

(65) Prior Publication Data
US 2018/0267542 A1 Sep. 20, 2018

(51) Int. Cl.
*G05D 1/00* (2006.01)
*G05D 1/02* (2020.01)

(52) U.S. Cl.
CPC ........... *G05D 1/0088* (2013.01); *G05D 1/024* (2013.01); *G05D 1/0272* (2013.01); *G05D 2201/0216* (2013.01)

(58) Field of Classification Search
CPC .. G05D 1/0088; G05D 1/0231; G05D 1/0234; G05D 1/0238; G05D 1/0244; G05D 1/0246; G05D 1/0248
See application file for complete search history.

(56) References Cited

U.S. PATENT DOCUMENTS

| | | | | |
|---|---|---|---|---|
| 4,736,812 A | * | 4/1988 | Livneh | G05D 1/0265 180/167 |
| 5,524,723 A | * | 6/1996 | Gramling | G05D 1/0265 104/286 |
| 5,548,511 A | * | 8/1996 | Bancroft | G05D 1/0221 15/319 |

(Continued)

FOREIGN PATENT DOCUMENTS

| | | |
|---|---|---|
| EP | 0403390 A1 | 12/1990 |
| JP | S62131309 A | 6/1987 |

(Continued)

OTHER PUBLICATIONS

International Search Report and Written opinion for PCT/EP2015/071799 dated Jun. 22, 2016.

*Primary Examiner* — Michael McCullough
(74) *Attorney, Agent, or Firm* — Pearne & Gordon LLP

(57) ABSTRACT

A method for displacing a mobile robot on a virtual path within a workspace, comprising the generation of a synthetic offset, indicative of a lateral displacement between the instantaneous position of the mobile robot and the virtual path. The method may also include the generation of virtual tags and may be used in the retrofit or upgrade of autonomous vehicles of the line-following type.

8 Claims, 2 Drawing Sheets

(56) References Cited

U.S. PATENT DOCUMENTS

| | | | | |
|---|---|---|---|---|
| 6,732,826 | B2 * | 5/2004 | Song | A47L 9/009 |
| | | | | 15/340.1 |
| 6,971,464 | B2 * | 12/2005 | Marino | B60T 7/16 |
| | | | | 180/167 |
| 8,190,295 | B1 * | 5/2012 | Garretson | G05D 1/0038 |
| | | | | 700/245 |
| 8,676,426 | B1 * | 3/2014 | Murphy | G05D 1/0265 |
| | | | | 180/167 |
| 8,897,947 | B2 * | 11/2014 | Nakano | G05D 1/0214 |
| | | | | 318/568.12 |
| 2002/0153184 | A1 | 10/2002 | Song et al. | |
| 2009/0118890 | A1 * | 5/2009 | Lin | G05D 1/0246 |
| | | | | 701/28 |
| 2017/0173794 | A1 * | 6/2017 | Ma | H04W 4/70 |
| 2017/0233231 | A1 * | 8/2017 | Gariepy | B66F 9/0755 |
| | | | | 701/2 |

FOREIGN PATENT DOCUMENTS

| | | |
|---|---|---|
| JP | H0631657 A | 2/1994 |
| JP | H0772924 | 3/1995 |

\* cited by examiner

VIRTUAL LINE-FOLLOWING AND RETROFIT METHOD FOR AUTONOMOUS VEHICLES

FIELD OF THE INVENTION

The present invention relates, in embodiments with an autonomous vehicle like, but not exclusively, a wheeled robotized vehicle.

DESCRIPTION OF RELATED ART

Autonomous robotized vehicles are self-propelled devices capable of navigating within an environment in a free manner, without constant human support, to perform a desired task. Multiple application of robot vehicles have been developed in very different areas including, among others, warehouses, factories, hospitals, nuclear plants, and mines.

In known applications, autonomous robots comprise one or more sensors capable of analysing the environment in which the robot is located. The sensor may comprise ranging sensors, like for example radars, laser rangefinders, or acoustical rangefinders, bumpers, mechanical feelers, stereo cameras, accelerometers, gyroscopes, compasses, inclinometers, altimeters, or other environmental sensors. The present document will refer mainly to laser scanner, without loss of generality, being it intended that the invention may contemplate the use of other suitable sensors based on different principles.

Sensors are used in the process of mapping, aiming at creating a representation of the environment into which the robot is destined to operate. Typically, the robot is driven by an operator manually in the environment while the sensors register the position and/or ranges of landmarks in the environment. A map of the environment is then generated from the data so collected, usually with the aid of odometry data, by several known methods.

It is also known to use sensors in the localization of the vehicle in the map, which is the determination of the current location and orientation of the robot on the map. This can be achieved by internal odometry data alone, provided an initial localization is known (dead reckoning) or, preferably, by a combination of odometry and ranging data. The combination of position and orientation is referred to as the 'pose' of the robot and, in the case of 2D motion might be represented by a pair of Cartesian coordinates and one heading angle.

Sensors are also used as safety device to prevent collisions or minimise their severity: Many autonomous vehicles are equipped with omnidirectional laser scanners for this purpose: the scanners are programmed to generate a collision alert that causes the vehicle to stop when an obstacle is detected within a given safety range. More sophisticated obstacle management strategies are also possible, whereby a robot can be aware of moving obstacles (i.e. persons, other robots, objects that were not originally mapped or that have moved from their original mapped position) and take appropriate measures to prevent crashes.

Also known are line-following vehicles that is, vehicles that do not have sophisticated localization and/or navigation capabilities, but are arranged to follow a physical line, for example a buried inductive cable or a line painted on the floor. These vehicles include a line sensor that generates an offset signal determined by the distance between the sensor and the centre of the line. The robot follows the line by means of a control loop that minimizes the offset while advancing at a given speed.

Line-following vehicle can be programmed, in a limited fashion, by placing appropriate tags, for example barcodes or inductive RFID tags, along the line. The tags encode instruction for the robot including, for example, speed commands to accelerate, decelerate, and stop, exchange commands to switch individual vehicles on two different branches of a crossing, and others.

While line-following vehicles are appreciated for their economy and ruggedness, modifying their missions requires physically moving the lines and the associated tags, which is exceedingly cumbersome, time-consuming, and expensive.

BRIEF SUMMARY OF THE INVENTION

It is therefore an aim of the present invention to propose a device that uses a simple navigation control system, yet can be programmed in a flexible way. The invention also proposes a navigation method and a method of retrofitting an existing robot. These aims are achieved by the object of the independent claims in the corresponding categories, while dependent claims relate to advantageous, but optional, features.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 2:
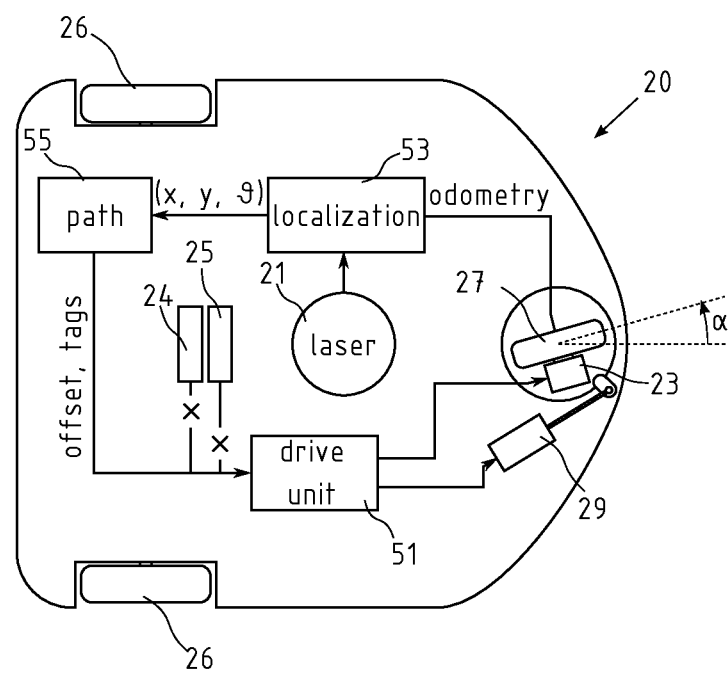
FIG. 2 illustrates schematically and in simplified form, a possible structure of a robot according to an aspect of the present invention.

FIG. 2 shows schematically a possible structure of a robotic vehicle 20 according to an aspect of the present invention. It must be understood that this is a conceptual representation and does not reflect all the features of an industrial product. The vehicle is shown, to present an example, a tricycle configuration, but it is not intended that the invention be limited to this kinematic system. The invention could in fact be applied to any autonomous robot of whatsoever configuration.

Propulsion of the robot is assured by the motorized wheel 27 that is driven by motor 23, while a second motor or actuator 29 is used to direct the vehicle, by determining the steering angle α. In most cases, since the robot moves in a two-dimensional workspace, at least two independent motors or actuators will be needed for navigation. The invention, however, is applicable to systems with any number of motors or actuators and to unidimensional, two-dimensional, or three-dimensional workspaces.

The motors 23 29 are driven by a drive unit that generates the necessary power signals. The drive unit 51 may be of a kind suitable for a line-following robot, arranged for controlling the motors in order to minimize a lateral offset, while the mobile robots advances at a given speed.

The robot 20 includes also a sensor 21 that provide at least some degree of information about the position of the robot in its workspace. In the presented example, the sensor is a 360° laser scanner. Such devices are often used in mobile robots for safety and localization purposes, and are available from a number of manufacturers. Other devices that may be used as sensor include acoustical rangefinders, radars, optical 3D scanners, tactile sensors, radio receivers, and stereoscopic cameras, but the list is not exhaustive. The data generated by the sensor 21 are fused with odometry information gathered from the steering wheel and/or the back wheels 26, by the localization unit 53 that generates, in real time, an estimate of the robot's pose, including for example two linear coordinates x, y, and a yaw angle D.

Most robots include, besides the motors 23, 29, other actuators and transducers 57 necessary to accomplish their specific mission, like for example a forklift, tools for washing or cleaning the floor, a blade for cutting grass, a surveillance camera, a prehensile arm, or other. The sensor could be controlled by the drive unit 51, as represented, or by another controller means.

Figure 1:
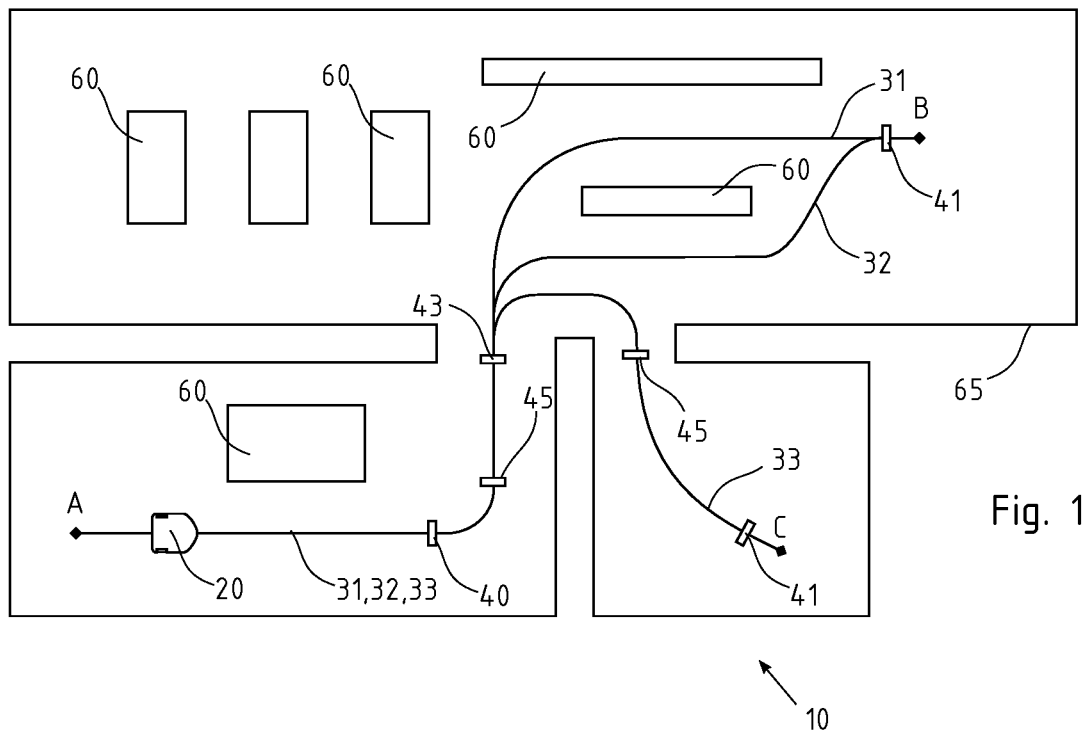
FIG. 1 shows schematically a plan of the environment into which a robot operates, with lines corresponding to possible robot tasks.

The path 31 (see FIG. 1) that the robot is supposed to follow in the workspace has been defined beforehand, by any suitable method, and is stored in a memory that is accessible by a path following module 55. The path is a notional line that joins a starting point A to a destination point B, respecting all the map constraints, like walls 65 and objects 60. The computing module receives instantaneous localization data (x, y, $\vartheta$) from the localization unit, and synthesizes an offset value, representing the lateral distance between the path line and the center, or another suitable reference point, of the robot 20.

The offset value, suitably encoded as electrical digital or analogue signal, as the case may be, is fed to the drive unit 51 that uses it to steer the robot such as to minimize the offset from the path line. In a very simple realization, the drive unit simple turns the steering wheel to the right when the sign of the offset indicates that the path is on that side, and conversely to the left. More advanced control strategies are also possible, however.

Importantly, the navigation method of the invention can also be employed to upgrade or retrofit a line-following robot that does not have a complete localization and navigation suite. Such robots often include a laser or another sensor for safety purposes that can be used also for localization, and their drive units is configured to respond to an offset signal generated by a line sensor 24. The line sensor is disconnected, and the drive unit is given the offset signal synthesized by the path following unit 55 rather than that derived by the physical line. In this manner, the path of the robot can be reprogrammed by software entirely, changing the data used by the path following unit 55, with a minimal intervention on robot's hardware.

Not only the invention allows to change the predetermined paths with ease, but it also permits to alter the paths dynamically according to the need. For example, a control system may detect that the path 31 is not practicable, and reprogram the data of the path following unit 55 to send the robot on alternate path 32 instead.

Another advantage is that path crossings and branches are now possible without limitation. In traditional line-following systems, crossings and branches required special tags that instructed the vehicles on what branch they must follow. In the invention, each robot follows a special virtual path known by its path following unit 55 and no special crossing management is required.

Although the present discussion refers to functional entities like the localization module 53, the path following unit 55, and others, it is important to understand that these need not necessarily be embodied by distinguishable and separate pieces of hardware. Such functions could be implemented, without leaving the scope of the invention partly or totally by software means, and they might share resources among them, or with other functional units.

Moving a robot along a path requires not only the control of the position along a path, but also, for example, managing the speed of the robot. This is traditionally achieved, in line-following robots, by placing tags at suitable points of the path, which are read by a suitable tag reader 25 in the robot. In the frame of the invention, the tags are also virtual, the tag reader is disconnected or omitted, and the path following unit 55 synthesizes tag signals for the drive unit 51 at the appropriate moments and positions so to obtain the desired speed profile. Tags can be used to specify a constant speed, an acceleration or deceleration ramp, or other actions, including sending commands to the robot's actuators and sensors 57.

In some cases, the tags may be generated when the robot passes over a predetermined position, thus repeating exactly the functioning of the physical tags, except for the need of sticking or affixing the tag in place.

More advantageous, the invention can generate tags automatically, not based only on the instant position, but also on the dynamic condition of the robot and on a forthcoming section of the virtual path. The system can be programmed to synthesize automatically a slow-down tag 40 before a sharp corner or a braking point, for example by imposing thresholds on the lateral and longitudinal acceleration imposed on the vehicle, and a speed-up tag 45 after the corner. Tag generation is based on a following section of the virtual path and not only on the instantaneous location. Deceleration tag 43, for example, will be generated only for vehicles following path 33, but not for those who are on paths 31 or 32. Slow-down and stop tags 41 are inserted automatically before the destination points. Any change in the shape of the path automatically causes the corresponding tags to move in the appropriate new positions.

In a possible variant, the path following unit 55 generates a series of tags that specify progressively increasing or decreasing speed, so to obtain a speed ramp. The automatic generation of virtual tags enables in fact, full control of the speed of the vehicle in real time. If the drive unit 51 is capable of processing a tag specifying an acceleration or deceleration ramp, the path following unit 55 will generate one single tag to that purpose. The invention includes also variants in which the forward speed can be communicated directly and in real time to the drive unit 51. In such cases, acceleration and deceleration ramps could be obtained whenever necessary without generating a virtual tag. Virtual tags causing the vehicle to change its speed could still be generated if convenient, for example for compatibility with legacy systems.

Figure 3:
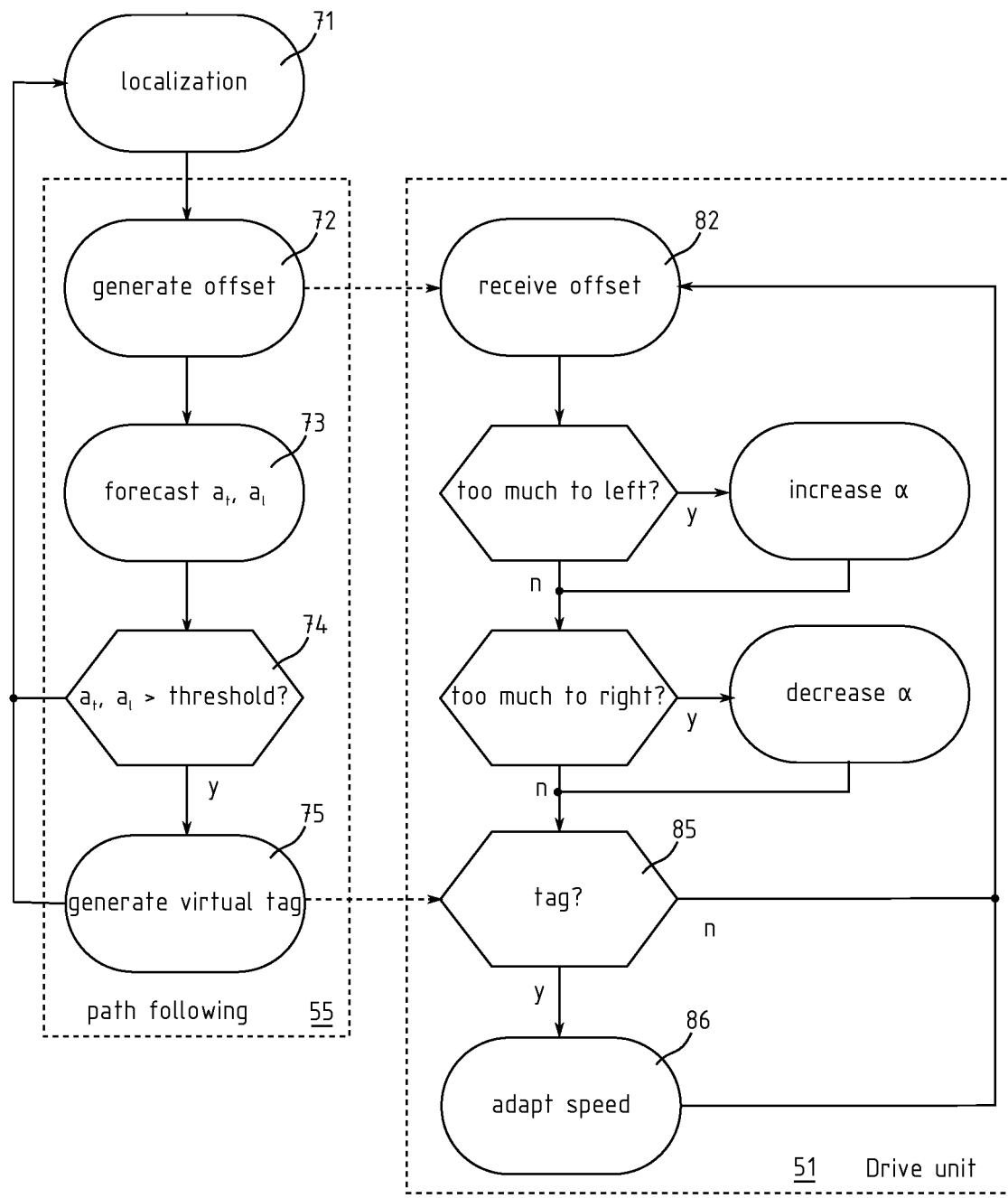
FIG. 3 is a flowchart representation of a method according to an aspect of the invention.

FIG. 3 illustrates a possible structure of the inventive method. The flowchart indicates the steps carried out by the path following unit 55 and those that take place in the drive unit 51.

The path following unit 55 receives the position data generated by the localization unit (step 71) and generates an offset corresponding to the distance between the vehicle and the virtual path (step 72). The virtual path has been defined in a prior planning process that is not indicated in the figure. The offset is received by the drive unit (step 82) that steers the vehicle in order to reduce the offset. The figure illustrates a very simple method but, in a real implementation, the control scheme could be considerably more advanced.

In step 73, the path following unit considers a forthcoming part of the path and forecasts actions that the robot will need to perform. The path following unit 55 may compute the acceleration of the vehicle if the path should be followed at the given speed. The acceleration is then checked against defined thresholds for longitudinal acceleration $a_l$ and transverse acceleration $a_t$. If one acceleration exceeds a threshold, as it might be the case if the path foresees a tight corner or a hard braking, the path following units 55 will act to ensure that the robot's speed is reduced to a safer value. Conversely, when exiting from a corner or when a situation that required that the robot should advance only slowly is ended, the path following unit will take cause the robot to speed up. In the same way, the path following unit may foresee and arrange the actuation of a forklift or of another actuator 57.

Robot's action can be commanded directly by the path following unit 55 when a suitable interface exist or, as shown in FIG. 3, caused by the generation of one or several virtual tags (step 75) that are received by the drive unit (step 85) which adapts the speed or execute a command (step 86).

REFERENCE NUMBERS

A start point
B, C end points
α steering angle
x, y, ϑ pose of the vehicle
10 workspace
20 robotic vehicle
21 laser scanner
23 traction motor
24 line sensor
25 tag sensor
26 rear wheel
27 steering and power wheel
29 steering motor
31 path
32 alternate path
33 second path
40 virtual tag: slow down
41 virtual tag: stop
43 virtual tag: slow down
45 virtual tag: speed up
51 motor drive
53 localization
55 path following module
57 actuators and/or sensors
60 object
65 wall
71 localization
72 generation of a synthesized offset
73 forecast of $a_t$ and $a_l$
74 test for acceleration above threshold
75 generation of a virtual tag
82 reception of a synthesized offset
85 reception of a virtual tag
86 adaptation of the speed

What is claimed is:

1. A method of retrofitting or upgrading an automatic line-following vehicle (20) and adding the ability of following a notional virtual path (31, 32, 33), whereby the vehicle has a line sensor (24), motion actuators (27, 29), and a drive unit (51), the drive unit receiving a signal from the line sensor (24) and being adapted for driving the actuators (27, 29) such as to keep the line in the middle of the line sensor (24); the method including: providing a localization unit (53) arranged for determining the position or of the pose of the vehicle (x, y, ϑ); providing a path following unit (55) arranged for determining an offset indicative of a measure of a lateral displacement between the instantaneous position of the mobile robot and the virtual path (31, 32, 33) and synthesizing a virtual line sensor output signal based on said offset; providing said virtual sensor output to said drive unit (51).

2. The method of claim 1 wherein the localization unit (53) determines the position or of the pose of the vehicle (x, y, ϑ) based on sensor data and odometry data, said sensor data being obtained by one or more devices from: laser scanner (21), ultrasonic rangefinder, radar, stereoscopic camera, bumper, tactile sensors, radio receiver, compass, gyroscope, accelerometer, altimeter, inclinometer, or other environmental sensor.

3. The method according to claim 1, further comprising: generating at least one virtual tag (40, 45, 43, 41) on the virtual path, the virtual tag being a notional position associated to an instruction to the robot, and, during the displacement of the robot, determine the tag-crossing instant when the robot (20) rides over the virtual tag (40, 45, 43, 41) and, at the tag-crossing instant, execute the instruction.

4. The method of claim 3, comprising the generation of commands or virtual tags that cause the mobile robot to accelerate and/or decelerate.

5. The method of claim 3, comprising the generation of commands or virtual tags that cause the mobile robot to operate an actuator.

6. The method according to claim 1, wherein the virtual tag (40) is automatically generated at a position along the virtual path (31) that is dependent from the acceleration in a successive portion of the virtual path.

7. The method of claim 1, comprising the generation of commands or virtual tags that cause the mobile robot to accelerate and/or decelerate.

8. The method of claim 1, comprising the generation of commands or virtual tags that cause the mobile robot to operate an actuator.

* * * * *

UNITED STATES PATENT AND TRADEMARK OFFICE
CERTIFICATE OF CORRECTION

| | |
|---|---|
| PATENT NO. | : 10,725,471 B2 |
| APPLICATION NO. | : 15/761480 |
| DATED | : July 28, 2020 |
| INVENTOR(S) | : Lamon et al. |

It is certified that error appears in the above-identified patent and that said Letters Patent is hereby corrected as shown below:

In the Specification

Column 3, Line 11: "yaw angle D." should be -- yaw angle $\theta$ --.

Signed and Sealed this
Twenty-first Day of February, 2023

*Katherine Kelly Vidal*

Katherine Kelly Vidal
*Director of the United States Patent and Trademark Office*